United States Patent
Baird

(10) Patent No.: US 9,116,725 B1
(45) Date of Patent: Aug. 25, 2015

(54) SYSTEMS AND METHODS FOR USING VIRTUALIZATION OF OPERATING-SYSTEM-LEVEL COMPONENTS TO FACILITATE SOFTWARE TESTING

(75) Inventor: Bradley Baird, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 1198 days.

(21) Appl. No.: 13/048,305

(22) Filed: Mar. 15, 2011

(51) Int. Cl.
*G06F 9/455* (2006.01)
*G06F 11/36* (2006.01)

(52) U.S. Cl.
CPC ............ *G06F 9/455* (2013.01); *G06F 11/3696* (2013.01)

(58) Field of Classification Search
None
See application file for complete search history.

(56) References Cited

U.S. PATENT DOCUMENTS

| | | | |
|---|---|---|---|
| 6,128,647 A | 10/2000 | Haury | |
| 6,347,331 B1* | 2/2002 | Dutcher et al. | 709/203 |
| 6,512,526 B1* | 1/2003 | McGlothlin et al. | 715/762 |
| 6,920,555 B1* | 7/2005 | Peters et al. | 713/100 |
| 6,931,546 B1 | 8/2005 | Kouznetsov et al. | |
| 7,028,305 B2 | 4/2006 | Schaefer | |
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 7,451,196 B1 | 11/2008 | de Vries et al. | |
| 7,461,086 B1 | 12/2008 | Hurren et al. | |
| 7,461,096 B1 | 12/2008 | Hurren et al. | |
| 7,496,931 B2 | 2/2009 | Cook et al. | |
| 7,512,977 B2 | 3/2009 | Cook et al. | |
| 7,519,963 B1 | 4/2009 | Blaser et al. | |
| 7,542,988 B1 | 6/2009 | Cook et al. | |
| 7,549,164 B2 | 6/2009 | Cook et al. | |
| 7,620,956 B2* | 11/2009 | Cook et al. | 719/313 |
| 7,657,695 B1* | 2/2010 | Wheeler | 711/6 |
| 7,725,737 B2* | 5/2010 | Konanka et al. | 713/190 |

(Continued)

FOREIGN PATENT DOCUMENTS

EP 1083483 A1 3/2001
JP 2005284925 A 10/2005

OTHER PUBLICATIONS

Registry Virtualization, http://msdn.microsoft.com/en-us/library/aa965884%28v=vs.85%29.aspx, as accessed Mar. 13, 2011.

(Continued)

*Primary Examiner* — Matthew Brophy
(74) *Attorney, Agent, or Firm* — ALG Intellectual Property, LLC

(57) ABSTRACT

A computer-implemented method for facilitating software testing using operating-system component virtualization may include 1) identifying a software product installed on a computing system comprising a base operating system; 2) selecting an operating-system-level component with which the software product is to be tested; 3) isolating the operating-system-level component in a virtualization layer that is distinct from the base operating system; 4) activating the virtualization layer such that access requests directed to the base operating system for the operating-system-level component are redirected to the virtualization layer; 5) testing the software product while the virtualization layer is active to determine how the software product would function if the operating-system-level component was part of the base operating system; and 6) after the testing is complete, deactivating the virtualization layer such that the operating-system-level component is no longer visible to the base operating system or the software product.

20 Claims, 7 Drawing Sheets

(56) References Cited

U.S. PATENT DOCUMENTS

| | | | |
|---|---|---|---|
| 7,840,790 B1* | 11/2010 | Sekhar et al. | 713/1 |
| 7,877,413 B1 | 1/2011 | Cook et al. | |
| 7,886,291 B1 | 2/2011 | Jones et al. | |
| 7,945,897 B1 | 5/2011 | Cook | |
| 7,970,789 B1 | 6/2011 | Blaser et al. | |
| 8,010,961 B1 | 8/2011 | Cook et al. | |
| 8,060,940 B2 | 11/2011 | McCorkendale et al. | |
| 8,090,744 B1* | 1/2012 | Baird | 707/791 |
| 8,108,346 B1 | 1/2012 | Hurren et al. | |
| 8,112,392 B1 | 2/2012 | Bunnell et al. | |
| 8,112,767 B1 | 2/2012 | Cook | |
| 8,141,092 B2* | 3/2012 | Brown et al. | 718/104 |
| 8,225,316 B1 | 7/2012 | Bunnell et al. | |
| 8,261,254 B2 | 9/2012 | Cook | |
| 8,291,407 B2 | 10/2012 | Greenwood et al. | |
| 8,302,108 B1 | 10/2012 | Hurren et al. | |
| 8,321,843 B2* | 11/2012 | Lanner et al. | 717/127 |
| 8,341,648 B1 | 12/2012 | Cook | |
| 8,359,492 B2* | 1/2013 | Park et al. | 714/15 |
| 8,407,700 B2 | 3/2013 | Bunnell et al. | |
| 8,453,118 B2* | 5/2013 | Liu | 717/127 |
| 8,464,245 B2* | 6/2013 | Thornley | 717/174 |
| 8,494,964 B1* | 7/2013 | Sanderson | 705/51 |
| 8,572,033 B2* | 10/2013 | Shukla | 707/620 |
| 8,612,994 B1 | 12/2013 | Sanderson | |
| 8,667,482 B2* | 3/2014 | Bernardi et al. | 717/174 |
| 8,683,459 B2* | 3/2014 | Gebhart et al. | 717/172 |
| 8,732,182 B2* | 5/2014 | Bethlehem et al. | 707/758 |
| 8,881,140 B1* | 11/2014 | Bringhurst | 718/1 |
| 2002/0083183 A1 | 6/2002 | Pujare et al. | |
| 2003/0233647 A1 | 12/2003 | Blaser et al. | |
| 2004/0078568 A1 | 4/2004 | Pham et al. | |
| 2004/0107179 A1 | 6/2004 | Dalrymple, III et al. | |
| 2004/0139128 A1 | 7/2004 | Becker et al. | |
| 2004/0139309 A1* | 7/2004 | Gentil et al. | 713/1 |
| 2005/0066337 A1* | 3/2005 | Quinn | 719/321 |
| 2005/0172279 A1* | 8/2005 | Cook et al. | 717/162 |
| 2006/0074618 A1* | 4/2006 | Miller et al. | 703/13 |
| 2006/0090136 A1* | 4/2006 | Miller et al. | 715/734 |
| 2006/0129992 A1* | 6/2006 | Oberholtzer et al. | 717/124 |
| 2006/0130041 A1* | 6/2006 | Pramanick et al. | 717/168 |
| 2007/0089111 A1* | 4/2007 | Robinson et al. | 718/1 |
| 2007/0180450 A1 | 8/2007 | Croft et al. | |
| 2008/0091792 A1 | 4/2008 | Mei et al. | |
| 2008/0307414 A1* | 12/2008 | Alpern et al. | 718/1 |
| 2009/0192780 A1 | 7/2009 | Carbone et al. | |
| 2010/0107113 A1* | 4/2010 | Innes et al. | 715/779 |
| 2010/0138823 A1* | 6/2010 | Thornley | 717/174 |
| 2010/0153924 A1* | 6/2010 | Andrews | 717/126 |
| 2010/0229169 A1* | 9/2010 | Bunnell et al. | 718/1 |
| 2010/0318992 A1* | 12/2010 | Kushwaha et al. | 718/1 |
| 2011/0061045 A1 | 3/2011 | Phillips | |
| 2011/0251992 A1* | 10/2011 | Bethlehem et al. | 707/610 |
| 2013/0179673 A1* | 7/2013 | Innes et al. | 713/2 |
| 2013/0246473 A1* | 9/2013 | Pedersen et al. | 707/784 |

OTHER PUBLICATIONS

Search Server Viruralization, Virtualized test and development environments, http://searchservervirtualization.techtarget.com/resources/Virtualized-test-and-development-environments, as accessed May 31, 2012.

Jared Blaser; Process Tracking Application Layered System; U.S. Appl. No. 11/324,571, filed Jan. 3, 2006.

Lance TeNgaio; Distributed Application Virtualization; U.S. Appl. No. 12/142,549, filed Jun. 19, 2008.

Cynthia Bringhurst; Systems and Methods for Virtualizing Software Associated with External Computer Hardware Devices; U.S. Appl. No. 12/554,413, filed Sep. 4, 2009.

Bradley Baird; Systems and Methods for Merging Virtual Layers; U.S. Appl. No. 12/843,098, filed Jul. 26, 2010.

Michael Spertus, et al.; Systems and Methods for Using Virtualization to Implement Information Rights Management; U.S. Appl. No. 12/715,213, filed Mar. 1, 2010.

Sourabh Satish, et al.; Systems and Methods for Replicating Computing System Environments; U.S. Appl. No. 14/269,145, filed May 4, 2014.

Randall R. Cook; Dynamic Insertion and Removal of Virtual Software Sub-Layers; U.S. Appl. No. 13/551,576, filed Jul. 17, 2012.

FireEye, Inc.; http://www.fireeye.com/, as accessed Mar. 18, 2014; Oct. 12, 1999.

Palo Alto Networks; https://www.paloaltonetworks.com/, as accessed Mar. 18, 2014; Oct. 18, 2000.

Rajeev Nagar; Windows NT File System Internals—A Developer's Guide; Sep. 1997; Chapter 4, pp. 1-58.

International Business Machines Corporation; Method for permitting several versions of a module to coexist within a virtual machine; Research Disclosure, Mason Publications; Mar. 1, 2001; vol. 443, No. 177; Mason Publications; Hampshire, GB.

* cited by examiner

SYSTEMS AND METHODS FOR USING VIRTUALIZATION OF OPERATING-SYSTEM-LEVEL COMPONENTS TO FACILITATE SOFTWARE TESTING

BACKGROUND

A significant aspect of software testing, both for software developers (e.g., software quality assurance teams) and Information Technology ("IT") administrators, is determining how software will execute with different settings, on different types of hardware, and in different operating system environments. Thus, it may be important for software testers to be able to quickly change the configuration of a software testing environment.

To reduce the time involved in changing the configuration of a software testing environment, software testers may perform testing on virtual machine images. While using virtual machines images for testing may speed up many testing processes, such an approach may also introduce an additional test variable—the virtual machine. Sometimes, a software product that runs flawlessly on a virtual machine may have problems when running on a physical machine, and these problems may go undetected if the software is only tested on a virtual machine. Furthermore, using virtual machines for testing may still take a significant amount of time and consume significant resources, especially in situations where a software tester may want to test a software product using numerous relatively small configuration changes.

What is needed, therefore, is a more efficient and effective mechanism for testing software with different settings, using different types of hardware, in different operating system environments, and/or in any other context.

SUMMARY

As will be described in greater detail below, the instant disclosure generally relates to systems and methods for using virtualization of operating-system-level components to facilitate software testing. For example, a method may include: 1) identifying a software product installed on a computing system comprising a base operating system; 2) selecting an operating-system-level component with which the software product is to be tested; 3) isolating the operating-system-level component in a virtualization layer that is distinct from the base operating system; 4) activating the virtualization layer such that access requests directed to the base operating system for the operating-system-level component are redirected to the virtualization layer; 5) testing the software product while the virtualization layer is active to determine how the software product would function if the operating-system-level component was part of the base operating system; and 6) after the testing is complete, deactivating the virtualization layer such the operating-system-level component is no longer visible to the base operating system or the software product.

The software product may be tested in a variety of different environments. For example, the computing system may be a software development environment, and testing the software product may include debugging the software product. In other embodiments, the software may be tested in an enterprise environment to determine how the software functions in the enterprise environment.

The operating-system-level component may include one or more of any of a variety of operating system resources. For example, the operating-system-level component may be a set of one or more registry entries (e.g., registry keys and/or other registry information), and activating the virtualization layer may cause the set of registry entries to be functionally merged with a registry of the base operating system. In some embodiments, the set of registry entries enable the software product to interact with an additional software product, and testing the software product may involve monitoring interactions between the software product and the additional software product to determine whether the software product and the additional software product interact in an expected manner.

As another example, the operating-system-level component may include a device driver for a hardware device, activating the virtualization layer may cause the hardware device to be accessible to the software product, testing the software product may include determining whether the software product is able to properly interact with the hardware device, and deactivating the virtualization layer may cause the hardware device to be inaccessible to the software product.

Another example of an operating-system-level component is a user profile, which may include registry entries associated with a particular user. When the operating-system-level component is a user profile, activating the virtualization layer may cause the user to be logged onto the computing system, testing the software product may include determining how the software product functions in the context of the user's profile, and deactivating the virtualization layer may cause the user to not be logged onto the computing system.

In some embodiments, the operating-system-level component may include a domain state of a network domain, activating the virtualization layer may cause the computing system to be part of the network domain associated with the domain state, and testing the software product may include determining whether the software product functions properly within the network domain.

The operating-system-level component may provide a testing alternative to a component that is already part of the operating system. For example, the operating system may include an integrated component that corresponds to the operating-system-level component in the virtualization layer, and the integrated component of the operating system would conflict with the operating-system-level component in the virtualization layer if the virtualized operating-system-level component was integrated directly into the operating system. In this example, the method for using virtualization to facilitate software testing may further include testing the software product while the virtualization layer is inactive to determine how the software product functions when the integrated component is part of the base operating system. The method may further include comparing functionality of the software product when the virtualization layer is inactive to functionality of the software product when the virtualization layer is active.

The methods and systems described herein may also be used to test multiple corresponding and/or alternative operating-system-level components. For example, the previously described method for using virtualization to facilitate software testing may further include: 1) selecting an additional operating-system-level component with which the software product is to be tested; 2) isolating the additional operating-system-level component in an additional virtualization layer that is distinct from the base operating system; 3) activating the additional virtualization layer such that access requests directed to the base operating system for the operating-system-level component are redirected to the additional virtualization layer; and 4) testing the software product while the additional virtualization layer is active to determine how the software product would function if the additional operating-system-level component was part of the base operating system.

In some embodiments, a system for using virtualization to facilitate software testing may include: 1) an identification module programmed to identify a software product installed on a computing system comprising a base operating system; 2) a selection module programmed to select an operating-system-level component with which the software product is to be tested; 3) an isolation module programmed to isolate the operating-system-level component in a virtualization layer that is distinct from the base operating system; 4) an activation module programmed to activate the virtualization layer such that access requests directed to the base operating system for the operating-system-level component are redirected to the virtualization layer; 5) a test module programmed to test the software product while the virtualization layer is active to determine how the software product would function if the operating-system-level component was part of the base operating system; 6) a deactivation module programmed to, after the testing is complete, deactivate the virtualization layer such that the operating-system-level component is no longer visible to the base operating system or the software product; and 7) at least one processor configured to execute the identification module, the selection module, the isolation module, the activation module, the test module, and the deactivation module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
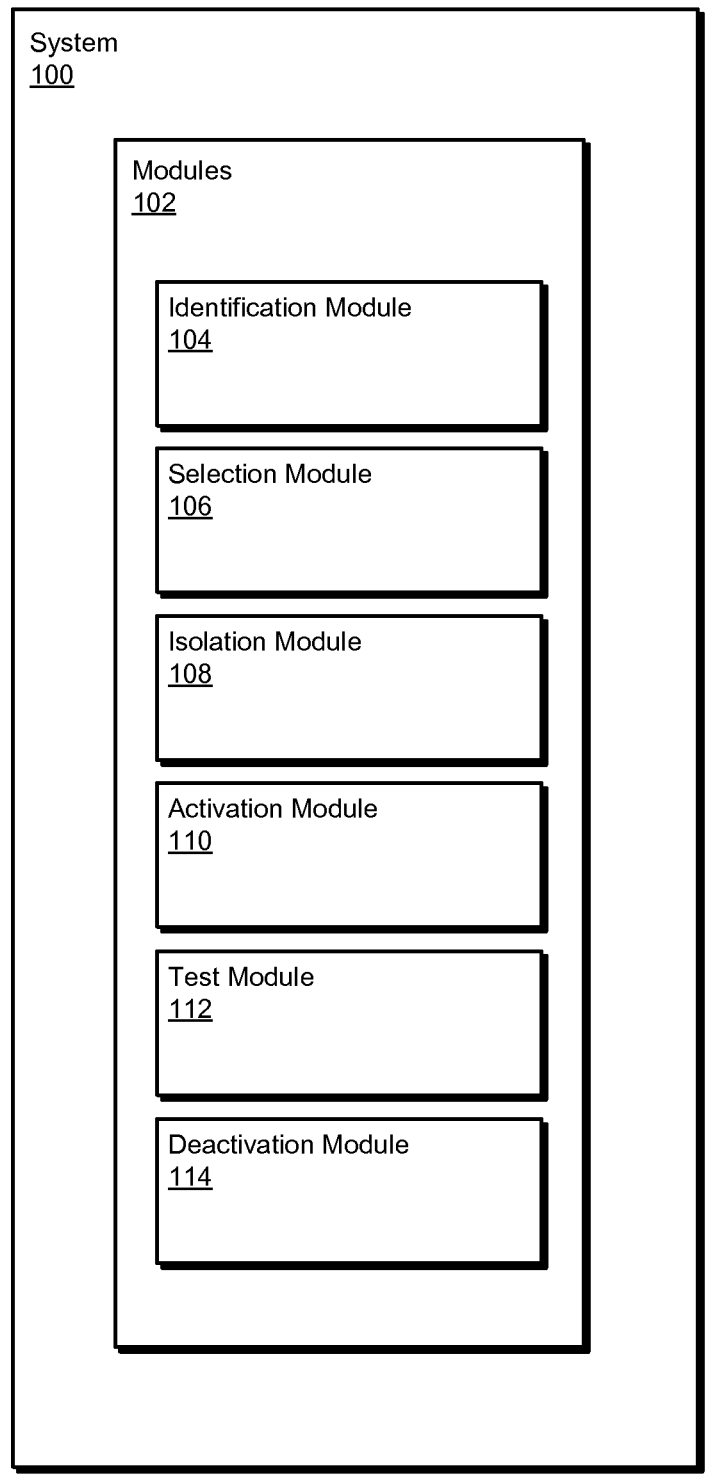
FIG. 1 is a block diagram of an exemplary system for using virtualization of operating-system-level components to facilitate software testing.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using virtualization of operating-system-level components to facilitate software testing. For example, a virtualization system may virtualize an operating-system-level component (e.g., a set of registry keys, a device driver, a user profile, etc.) to facilitate testing of a software product. The virtualization system may store the operating-system-level component in a virtualization layer such that the operating-system-level component may be quickly and easily activated and deactivated for testing purposes. In this manner, embodiments of the instant disclosure may provide for efficient and effective testing of software using a variety of settings, within a variety of environments, with different types of hardware, and in many other contexts.

Figure 2:
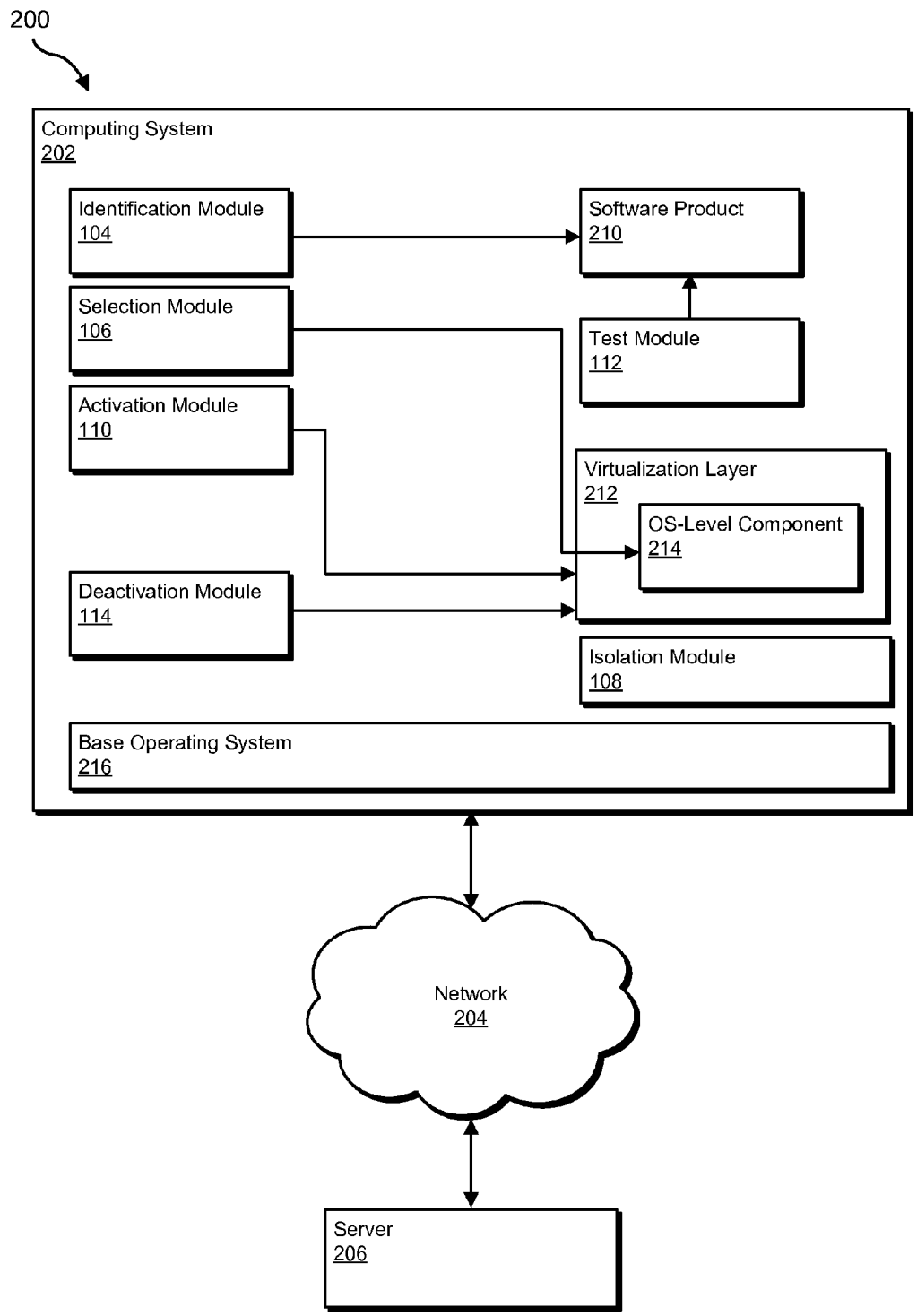
FIG. 2 is a block diagram of another exemplary system for using virtualization of operating-system-level components to facilitate software testing.

The following will provide, with reference to FIGS. 1-2, detailed descriptions of exemplary systems for using virtualization of operating-system-level components to facilitate software testing. Detailed descriptions of corresponding computer-implemented methods will also be provided in connection with FIG. 3. Detailed descriptions of exemplary virtualization systems will be presented in the discussion of FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for using virtualization of operating-system-level components to facilitate software testing. As illustrated in this figure, exemplary system 100 may include one or more modules 102 for performing one or more tasks. For example, and as will be explained in greater detail below, exemplary system 100 may include an identification module 104 programmed to identify a software product installed on a computing system comprising a base operating system. Exemplary system 100 may also include a selection module 106 programmed to select an operating-system-level component with which the software product is to be tested. In addition, and as will be described in greater detail below, exemplary system 100 may include an isolation module 108 programmed to isolate the operating-system-level component in a virtualization layer that is distinct from the base operating system.

System 100 may also include an activation module 110 programmed to activate the virtualization layer such that access requests directed to the base operating system for the operating-system-level component are redirected to the virtualization layer. As shown in FIG. 1, system 100 may further include a test module 112 programmed to test the software product while the virtualization layer is active to determine how the software product would function if the operating-system-level component was part of the base operating system. System 100 may further include a deactivation module 114 programmed to, after the testing is complete, deactivate the virtualization layer such that the operating-system-level component is no longer visible to the base operating system or the software product. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a server 206 via a network 204. In one embodiment, and as will be described in greater detail below, computing system 202 may be programmed with identification module 104, selection module 106, isolation module 108, activation module 110, test module 112, and deactivation module 114. Computing system 202 may also include a software product 210, a virtualization layer 212, and a base operating system 216. Virtualization layer 212 may include an operating-system-level component 214, with which software product 210 may be tested, as described in greater detail in the discussion corresponding to FIG. 3.

Base operating system 216 may be an operating system that runs directly on physical hardware of computing system 202 (i.e., base operating system 216 may not be part of a virtual machine or other virtual environment). Similarly, software product 210 may run directly within base operating system 216 (i.e., software product 210 may not be virtualized). Thus, in some embodiments of the instant disclosure, operating-system-level component 214 may be the only virtualized component on computing system 202, reducing the number of variables involved in testing software product 214 and reducing or eliminating many of the disadvantages of testing software using a virtual machine image and/or a virtualized software application.

Alternatively, base operating system 216 and/or software product 210 may be virtualized. In other words, software 210 may be tested within a virtual environment, and embodiments of the instant disclosure may still provide various advantages (e.g., greater testing speed and efficiency) in such situations. For example, base operating system 216 may be a base operating system of a virtual machine and/or software product 210 may be installed to a virtualization layer.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Server 206 generally represent any type or form of computing device that is capable of communication with and running testing operations on computing system 202. While FIG. 2 shows all of modules 104-114 on computing system 202, in some embodiments one or more of modules 104-114 may be located on server 206, which may perform remote testing and monitoring of software product 210. Examples of server 206 include, without limitation, application servers and database servers configured to provide various database services and/or run certain software applications.

As noted, server 206 may communicate with computing system 202 over network 204. Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections.

Figure 3:
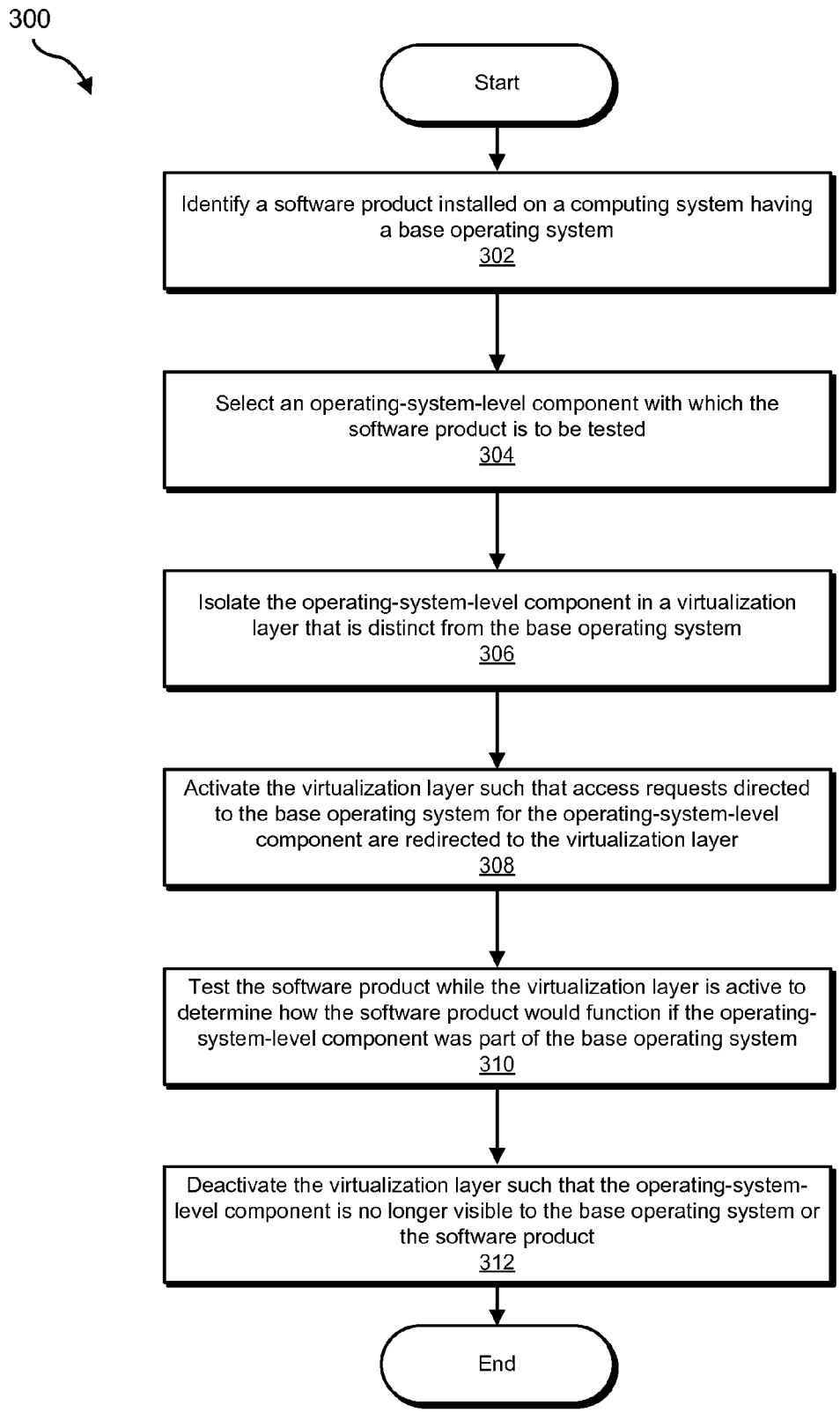
FIG. 3 is a flow diagram of an exemplary method for using virtualization of operating-system-level components to facilitate software testing.

FIG. 3 is a flow diagram of an exemplary computer-implemented method 300 for using virtualization to facilitate software testing. The steps shown in FIG. 3 may be performed by any suitable computer-executable code and/or computing system. In some embodiments, the steps shown in FIG. 3 may be performed by one or more of the components of system 100 in FIG. 1 and and/or system 200 in FIG. 2.

At step 302 in FIG. 3, one or more of the systems described herein may identify a software product installed on a computing system comprising a base operating system. For example, identification module 104 in FIG. 1 (which may, as detailed above, represent a portion of computing system 202 in FIG. 2) identify software product 210 on computing system 202. As used herein, the phrase "software product" generally refers to any type or form of computer-executable code, including software applications, device drivers, application plug-ins, operating system services or other operating system functions, an operating system kernel, and/or any other module or set of computer-executable code.

Identification module 104 may identify software product 210 in a variety of different manners and/or contexts. For example, identification module 104 may identify software product 210 when software product 210 is installed on computing system 202, when a user indicates that software product 210 is to undergo testing, and/or at any other suitable time. Identification module 104 may identify software product 210 by identifying an executable file associated with software product 210, by identifying one or more actions performed by software product 210, in a testing process in which software product 210 is being tested, and/or in any other suitable manner.

At step 304 in FIG. 3, one or more of the systems described herein may select an operating-system-level component with which the software product is to be tested. For example, selection module 106 in FIG. 1 (which may, as detailed above, represent a portion of computing system 202 in FIG. 2) select operating-system-level component 214 shown in FIG. 2. As used herein, the phrase "operating-system-level component" generally refers to any computer-executable code and/or data stored at an operating-system-level of a computing system. For example, an operating-system-level component may be a registry key, a dynamic-link-library file, a device driver, an application programming interface, a user interface component, a networking component, a security component, an operating system service or function, an operating system update, and/or any other part of an operating system.

Selection module 106 may select operating-system-level component 214 in a variety of manners and contexts. For example, selection module 106 may select operating-system-level component 214 in response to a user's request and/or identification of operating-system-level component 214 for use in testing software product 210. Additionally or alternatively, selection module 106 may automatically select operating-system-level component 214 for use in testing software product 210. In some embodiments, test module 112 may direct selection module 106 to select operating-system-level component 214 as part of a testing process managed by test module 112.

Selection module 106 may select operating-system-level component 214 when a test is about to be performed, during a test, as one of numerous components to be tested with software product 210 during a product or system test, and/or in a variety of other contexts.

At step 306 in FIG. 3, one or more of the systems described herein may isolate the operating-system-level component in a virtualization layer that is distinct from the base operating system. For example, isolation module 108 in FIG. 1 (which may, as detailed, represent a portion of computing system 202 in FIG. 2) isolate operating-system-level component 214 in virtualization layer 212 within computing system 202. Isolation module 108 may isolate operating-system-level components by redirecting requests to base operating system 216 for operating-system-level components to virtualization layer 212. Isolation module 108 may be part of a virtualization system that enables operating-system-component virtualization on computing system 202, as described in greater detail in the description corresponding to FIGS. 4 and 5.

In some embodiments, operating-system-level component 214 may be isolated from all other components of base operating system 216. For example, operating-system-level component 214 may be a single registry key entry, a single hardware and/or networking driver, a single application programming interface, and/or any other individual element of base operating system 216. Additionally or alternatively, operating-system level component 214 may be stored in virtualization layer 212 along with one or more other operating-system-level components.

At step 308 in FIG. 3, one or more the systems described herein may activate the virtualization layer such that access requests directed to the base operating system for the operating-system-level component are redirected to the virtualization layer. For example, activation module 110 in FIG. 1 (which may, as detailed above, represent a portion of computing system 202 in FIG. 2) activate virtualization layer 212 such that access requests directed to base operating system 216 for operating-system-level component 214 are redirected to virtualization layer 212. Activation module 110 may activate virtualization layer 212 by enabling virtualization layer 212 and/or otherwise overlaying virtualization layer 212 over base operating system 216. Like isolation module 108, activation module 110 may be part of a virtualization system that enables operating-system-component virtualization on computing system 202.

Activating virtualization layer 212 may cause operating-system-level component 214 to appear as though it is part of base operating system 216 even though it remains distinct from base operating system 216. For example, if operating-system-level component 214 includes a set of one or more registry entries, activating virtualization layer 212 may cause the set of registry entries to be functionally merged with a registry of base operating system 216. In other words, activating virtualization layer 212 may cause the registry entries to appear as though they are part of the base operating system registry. In some embodiments, the set of registry entries may take priority over any corresponding and/or conflicting registry entries already present in base operating system 216.

In one example, the virtualized registry entries may include a flag and/or other information that indicates an additional software product is supported and available to software product 210. In this example, activating virtualization layer 212 may functionally install support for the additional software product. For example, if the additional software product is a notification system, activating virtualization layer 212 containing registry keys associated with the notification system may enable software product 210 to interact with the notification system. In this manner, embodiments of the instant disclosure may enable software product 210 to interact with the notification system without requiring software product 210 to be uninstalled and then reinstalled with support for the notification system (as may have been required using traditional testing solutions).

As another example, operating-system-level component 214 may include a device driver for a hardware device. In such embodiments, activating virtualization layer 212 may cause the hardware device to be accessible to software product 210. In other words, activating virtualization layer 212 may make a hardware device visible and accessible to software product 210 on computing system 202.

In some embodiments, operating-system-level component 214 may include a user profile. As used herein, the phrase "user profile" generally refers to any collection of data associated with a specific user. In other words, a user profile may be a digital representation of a person's identity (e.g., including a name, username, logon credentials, and/or other personal information), a person's preferences for configuration of a graphical user interface (e.g., placing shortcuts on a desktop, in a taskbar, in a notification area, in the start menu, within certain folders or interfaces, etc.), settings set by the user for one or more programs (e.g., functional settings that control the operation of a program, settings that control the look and feel of a program, bookmarks or shortcuts accessed by the program, etc.), operating system settings, and/or any other settings or data that may be associated with a user.

In such embodiments, activating virtualization layer 212 may cause a user associated with the user profile (i.e., operating-system-level component 214) to be logged onto computing system 202. In other words, when operating-system-level component 214 is a user profile, activating virtualization layer 212 may perform the same function as logging the user into computing system 202, but without going through a conventional authentication process (e.g., without entering a username and password, etc.).

As another example, operating-system-level component 214 may include one or more elements that define a domain state of a network domain. As used herein, the phrase "domain state" may refer to any settings and/or other information that identifies and/or configures a network domain (e.g., enterprise network, home network, WINDOWS NT network, etc.) for a computing system. In such embodiments, activating virtualization layer 212 may cause computing system 202 to become part of the network domain associated with the domain state.

At step 310 in FIG. 3, one or more the systems described herein may test the software product while the virtualization layer is active to determine how the software product would function if the operating-system-level component was part of the base operating system. For example, test module 112 FIG. 1 (which may, as detailed above, represent a portion of computing system 202 in FIG. 2) may test software product 210 while virtualization layer 212 is active (i.e., enabled) to determine how software product 210 would function if operating-system-level component 214 was part of base operating system 216.

Test module 112 may test software product 210 in any suitable manner. For example, computing system 202 may include a software development environment (e.g., may be a computing device used by a software developer), and in such embodiments, test module 112 may test software product 210 by debugging software product 210. Test module 112 may additionally or alternatively perform a variety of other types of tests on software product 210 during development of software product 210. For example, test module 112 may test software product 210 by monitoring software product 210 and providing one or more reports on the behavior of software product 210.

Test module 112 may also test software product 210 in various other contexts. For example, a network administrator or other user may use test module 112 to test the configuration of an endpoint, such as computing system 202. In such embodiments, test module 112 may test software product 210 by determining whether software product 210 would function properly if operating-system-level component 214 was part of base operating system 216. Test module 112 may test whether software product 210 functions properly in a variety of different ways. For example, test module 112 may determine whether software product 210 functions properly when operating-system-level component 214 is active by determining whether software product 210 has conflicts with operating-system-level component 214, whether software product 210 interacts properly with operating-system-level component 214, whether software product 210 crashes or returns any other error when operating-system-level component 214 is active, and/or by making any other suitable determination.

In the example where operating-system-level component 214 includes a set of registry entries, test module 112 may test software product 210 by determining whether software product 210 properly accesses the registry entries and/or functions properly when the registry entries (e.g., which may be settings of software product 210) are accessed by software product 210. Alternatively, test module 112 may test software product 210 when operating-system-level component 214 includes a set of registry entries by monitoring interactions between software product 210 and an additional software product on computing system 202 to determine whether software product 210 and the additional software product interact in an expected manner (i.e., without errors or other issues, in accordance with a predetermined set of criteria, etc.). In such embodiments, test module 112 may identify any irregularities and/or errors in interactions between software product 210 and the additional software product.

In embodiments where operating-system-level component 214 is a device driver for a hardware device, testing software product 210 may include determining whether software product 210 is able to properly interact with the hardware device. For example, test module 112 may monitor software product 210 when it attempts to access the hardware device and may determine whether any errors or other issues arise when software product 210 attempts to access the hardware device.

In embodiments where operating-system-level component 210 includes all or a portion of a user's profile, test module 112 may test software product 210 by determining how software product 210 functions in the context of the user's profile. For example, a user profile may contain various settings and/or other features that may enhance or conflict with software product 210. Testing module 112 may test software product 210 by determining whether and how the setting changes affect software product 210 and/or may identify any conflicts or other issues that arise when the user profile is active. In this manner, test module 112 may be able to determine whether certain users will encounter problems if they log onto computing system 202 without actually having users log onto computing system 202. Furthermore, test module 112 may be able to quickly, efficiently, and effectively test how numerous user profiles function on computing system 202.

In the example where operating-system-level component 214 includes a domain state of a network domain, test module 112 may test software product 210 by determining whether software product 210 functions properly when computing system 202 is within the network domain.

At step 312 in FIG. 3, after the testing is complete, one or more of the systems described herein may deactivate the virtualization layer such that the operating-system-level component is no longer visible to the base operating system or the software product. For example, deactivation module 114 in FIG. 1 (which may, as detailed above, represent a portion of computing system 202 in FIG. 2) may deactivate virtualization layer 212 such that operating-system-level component 214 is no longer visible to base operating system 216 or software product 210. As used herein, the phrase "is no longer visible" generally refers to the inability of a software product or operating system to access, view, and/or otherwise use an operating-system-level component. Additionally or alternatively, the phrase "is no longer visible" may refer to calls from a software product or operating system no longer being redirected to the operating-system-level component. Access requests that had been redirected to virtualization layer 212 when it was active may be allowed to continue to base operating system 216 when virtualization layer 212 is inactive.

In embodiments where operating-system-level component 214 is a device driver for a hardware device, deactivating the virtualization layer may cause the hardware device to be inaccessible to software product 210. In embodiments where operating-system-level component 214 is a user profile, deactivating virtualization layer 212 may cause the user associated with user profile to not be logged onto computing system 202. In embodiments where operating-system-level component 214 comprises a domain state of a network domain, deactivating virtualization layer 212 may remove computing system 202 from the network domain associated with the domain state. Deactivating virtualization layer 212 may also cause various other settings, executable code, and/or components of an operating system to become unavailable to base operating system 216 and/or software product 210.

In some embodiments, operating system 216 may include an integrated component that corresponds to operating-system-level component 214 in virtualization layer 212. In one example, if operating-system-level component 214 is a registry key, base operating system 216 may include a conflicting registry key. As another example, if operating-system-level component 214 includes a device driver, base operating system 216 may include a conflicting device driver. Or if operating-system-level component 214 includes a user profile, base operating system 216 may include a conflicting user profile. In other words, the integrated component of base operating system 216 may conflict with operating-system-level component 214 in virtualization layer 212 if operating-system-level virtualization component 214 were integrated directly into operating system 216. In other words, if both the integrated component in base operating system 216 and operating-system-level component 214 were located in base operating system 216 at the same time, a conflict or other issues would arise rendering computing system 202 and/or software product 210 unstable or unusable and/or may result in errors or other problems when running software product 210.

Continuing with the previous example, test module 112 may test software product 210 while virtualization layer 212 is inactive to determine how software product 210 functions when the integrated component is part of the base operating system. Then, as an alternative, virtualization layer 212 may be activated and test module 112 may test operating-system-level component 214 with software product 210. Test module 112 may compare functionality of software product 210 when virtualization layer 212 is inactive (i.e., disabled) with functionality of software product 210 when virtualization layer 212 is active (i.e., enabled) to determine whether software product 210 functions better or more properly with operating-system-level component 214 or the component integrated into base operating system 216.

In another example, a second virtualization layer may be overlaid over virtualization layer 212. In this example, selection module 106 may select a second operating-system-level component with which software product 210 is to be tested. Isolation module 108 may isolate this additional operating-system-level component in the second virtualization layer, which may be distinct from base operating system 216 and/or virtualization layer 212. The second virtualization layer may be activated such that access requests directed to base operating system 216 for the operating-system-level component are redirected to the second virtualization layer. Then, test module 112 may test software product 210 while the second virtualization layer is active to determine how software product 210 would function if the second operating-system-level component was part of the base operating system. In other words, two or more virtualization layers may be used with corresponding operating-system-level components to enable test module 112 to test various different operating-system-level components and/or configurations by activating and deactivating corresponding virtualization layers.

Embodiments of the present disclosure may be able to test the functionality of a software product with a variety of different corresponding operating-system-level components without the need to install and uninstall such components or the need to uninstall and reinstall the software product. Thus, the systems and methods described herein may facilitate fast, efficient testing of software products using various (and numerous) settings, configurations, and environments. Furthermore, embodiments disclosed herein may enable virtualization with a high degree of granularity (e.g., as previously mentioned, virtualizing a single operating-system component), which may enable fast and efficient testing of numerous small changes in a system environment or software configuration.

Figure 4:
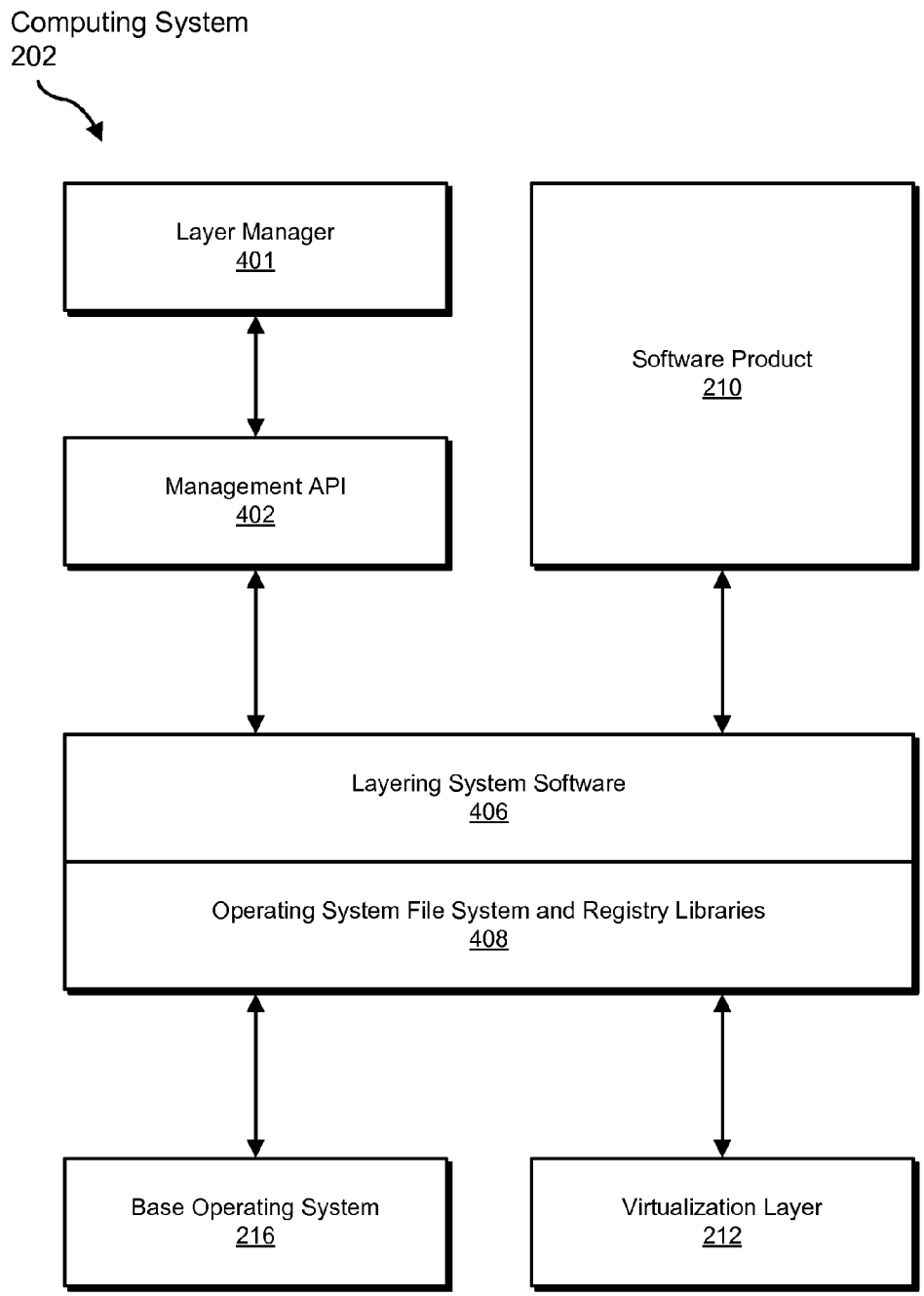
FIG. 4 is a block diagram of an exemplary virtualization system according to embodiments of the instant disclosure.
Figure 5:
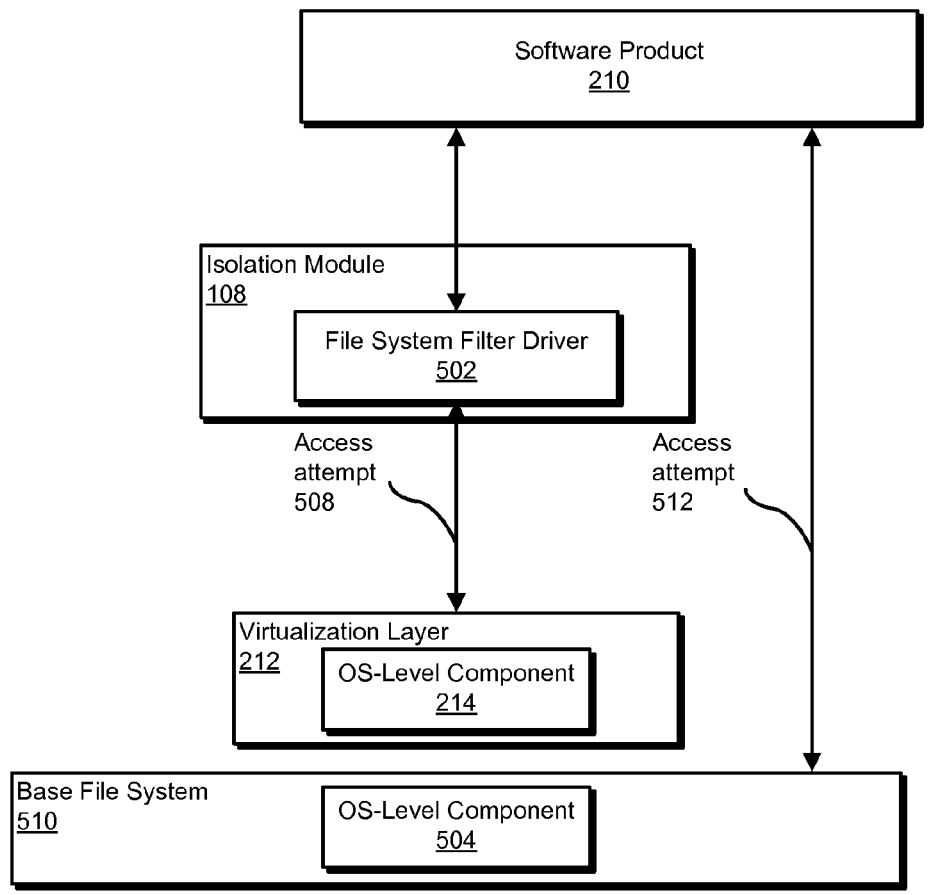
FIG. 5 is a block diagram showing functional aspects of a virtualization system according to embodiments of the instant disclosure.

FIGS. 4 and 5 illustrate conceptual examples of operating-system-level component virtualization. FIG. 4 shows a conceptual organization of components of computing system 202. FIG. 4 shows that, in addition to software product 210, base operating system 216, and layer 212, computing system 202 may include a layer manager 401, a management Application Programming Interface ("API") 402, layering system software 406, and operating system file system and registry libraries 408. Base operating system 216 may form a platform with which applications may be executed and from which files may be accessed in file systems. Base operating system 216 may include registry settings, which may be globally available to applications for reading and writing. Computing system 202 may include libraries 408 for executing the functions of base operating system 216. Libraries 408 may include operating system files and registry entries. Layering system software 406 may be tied to libraries 408. Layering system software 406 may interpret file system and registry accesses from software product 210. Layering system software 406 may include isolation module 108, activation module 110, and/or deactivation module 114.

If a testing operation is to be handled using virtualization, layer manager 401 may create a layer (e.g., layer 212) and layering system software 406 may redirect one or more file system or registry calls from software product 210 to layer 212, which may include one or more operating-system-level components. In some embodiments, test module 112 may automatically and autonomously (i.e., without user interaction and/or intervention) manage a testing process and may direct layer manager 401 to create layer 212. In other embodiments, a user may be involved in managing and directing one or more steps in a testing process.

FIG. 5 is an exemplary block diagram of computing system 202 showing how access requests may be redirected to a virtualization layer that contains an operating-system-level component. FIG. 5 shows that computing system 202 may include software product 210, isolation module 108, virtualization layer 212, and a base file system 510 (e.g., a file system managed by and corresponding to base operating system 216). Isolation module 108 may include a file system filter driver 502, virtualization layer 212 may include operating-system-level component 214, and base file system 510 may include an operating-system-level component 504.

During a software test managed by test module 112, test module 112 may direct activation module 110 to activate virtualization layer 212. Test module 112 may then direct software product 210 to make a first access attempt 508 to access an operating-system-level component. First access attempt 508 may be intercepted by file system filter driver 605. With virtualization layer 212 activated, file system filter driver 502 may redirect access attempt 508 to virtualization layer 212 to access operating-system-level component 214, as shown in FIG. 5. In response to access attempt 508, software product 210 may be provided with access to operating-system-level component 214. Test module 112 may monitor software product 210 and determine how software product 210 functions with access to operating-system-level component 214.

Test module 112 may direct deactivation module 114 to deactivate virtualization layer 212, and may then direct software product 210 may make a second access attempt 512 to access an operating-system-level component. With virtualization layer 212 deactivated, file system filter driver 502 may allow access attempt 512 to pass directly to base file system 510 to access operating-system-level component 504, as shown in FIG. 5. In response to access attempt 510, software product 210 may be provided with access to operating-system-level component 504. Test module 112 may monitor software product 210 and determine how software product 210 functions with access to operating-system-level component 504. Test module 112 may then compare how software product 210 functions when accessing operating-system-level component 214 with how software product 210 functions when accessing operating-system-level component 504.

As discussed above, when a virtualization layer storing an operating-system-level component is enabled, the operating-system level component may overlay any corresponding files of a base file system and/or base operating system. The base operating system may be presented with an expected view of data of a virtualized operating-system-level component by intercepting and manipulating file system calls to create the appearance that the virtualized operating-system-level component is from the base file system. File and registry calls may be manipulated by redirecting the calls to the virtualization layer rather than the base file system. In other words, virtualization software may intercept file system and/or registry calls. If the virtualization layer containing the operating-system-level component is activated (e.g., enabled), the virtualization software may redirect such calls to the virtualization layer. If the virtualization layer is not activated, the virtualization software may allow such calls to pass through to the base operating system, as discussed above.

Figure 6:
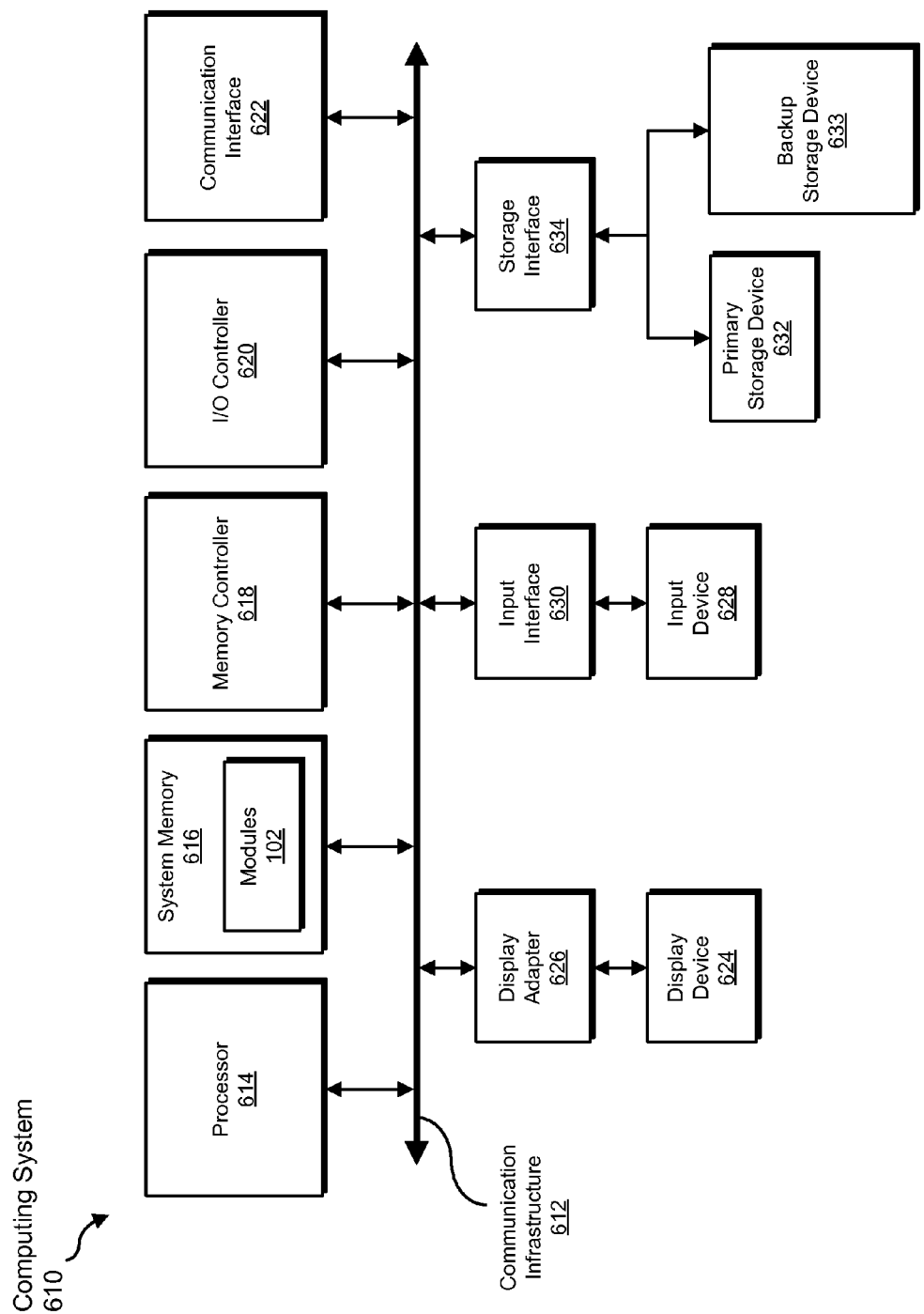
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, selecting, activating, testing, deactivating, debugging, monitoring, determining, and comparing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, selecting, activating, testing, deactivating, debugging, monitoring, determining, and comparing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, selecting, activating, testing, deactivating, debugging, monitoring, determining, and comparing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, selecting, activating, testing, deactivating, debugging, monitoring, determining, and comparing steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, selecting, activating, testing, deactivating, debugging, monitoring, determining, and comparing steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, selecting, activating, testing, deactivating, debugging, monitoring, determining, and comparing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media (i.e., non-transitory media), such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
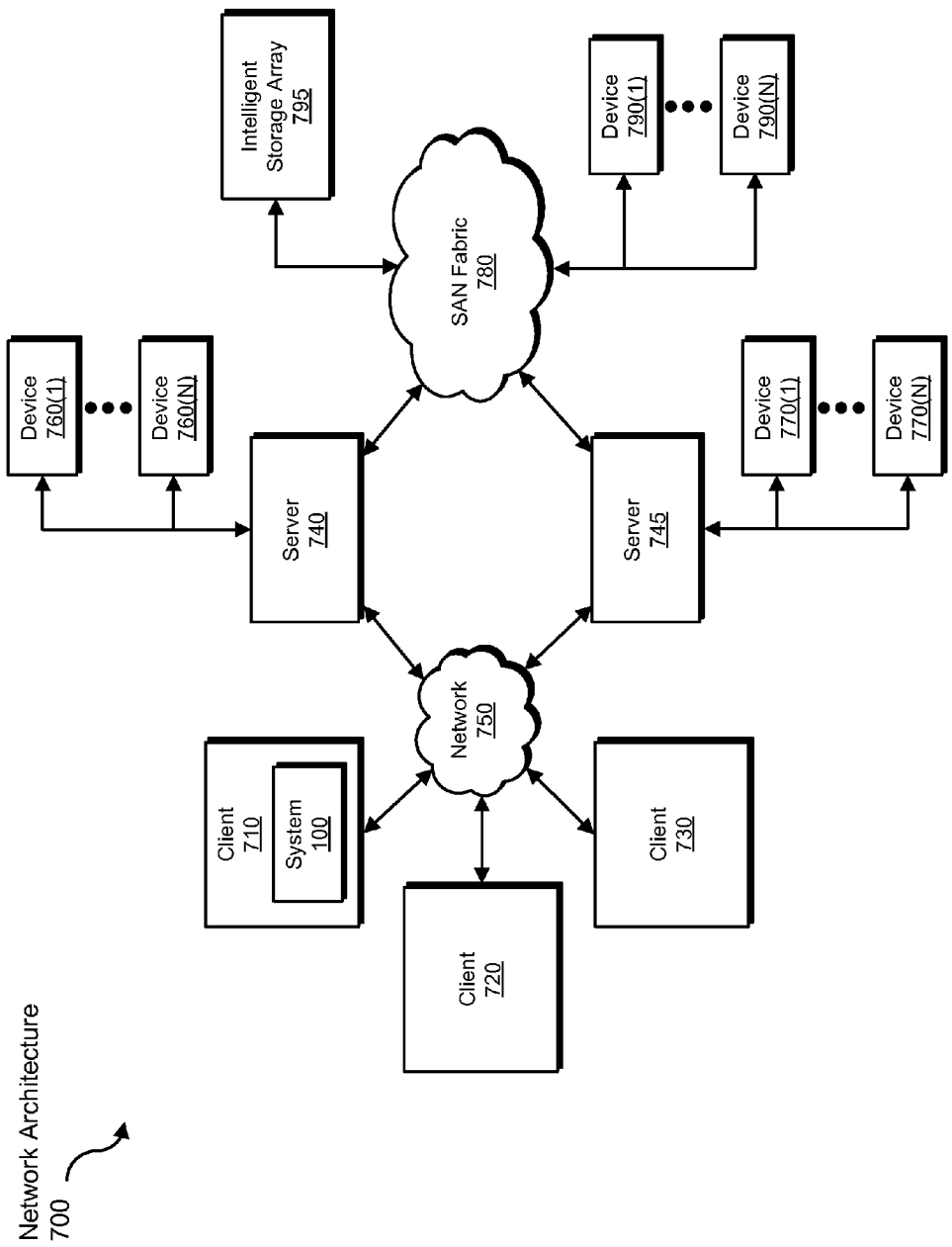
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, selecting, activating, testing, deactivating, debugging, monitoring, determining, and comparing steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for using virtualization of operating-system-level components to facilitate software testing.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system environment (e.g., including memory and/or other hardware devices and structures on the computing system) during a testing process by activating and deactivating a virtualization layer that includes an operating-system-level component.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using virtualization of operating-system-level components to facilitate software testing, wherein each operating system-level component comprises at least one of a registry key, a hardware driver, a network driver, or an application programming interface (API), at least a portion of the method being performed by a computing device comprising at least one processor, the method comprising:

managing software testing with a virtualized operating system component, wherein the software testing uses a testing module operating on the computing device to automatically, autonomously, and without user intervention, perform direct testing of a software product installed on a computing system comprising a base operating system, the testing comprising:

identifying, by the computing device at the request of the testing module, the software product installed on the computing system comprising the base operating system, wherein:

the base operating system comprises a plurality of operating-system-level components; the base operating system runs directly on the hardware of the computing system;

selecting, by the computing device at the request of the testing module, from within the plurality of operating-system-level components, an operating-system-level component for use in testing, wherein selecting the operating-system-level component comprises excluding at least one other component from within the plurality of operating-system-level components from use in testing;

isolating, by the computing device at the request of the testing module, an operating-system-level component that corresponds to the selected operating-system-level component in a virtualization layer that is distinct from the base operating system; activating, by the computing device at the request of the testing module, the virtualization layer such that access requests directed to the base operating system for the selected operating-system-level component are redirected to the virtualization layer; testing, by the computing device at the request of the testing module, the software product while the virtualization layer is active to determine how the software product would function if the isolated operating-system-level component were part of the base operating system; after the testing is complete, deactivating, by the computing device at the request of the testing module, the virtualization layer such that the isolated operating-system-level component is no longer visible to the base operating system or the software product; comparing, by the computing device at the request of the testing module, functionality of the software product when the virtualization layer is inactive to functionality of the software product when the virtualization layer is active to determine whether the software product functions properly when the virtualization layer is active.

2. The method of claim 1, wherein: the computing system comprises a software development environment; testing the software product comprises debugging the software product.

3. The method of claim 1, wherein: determining whether the software product functions properly when the virtualization layer is active comprises determining whether the software product would function properly if the isolated operating system-level component were part of the base operating system.

4. The method of claim 1, wherein: the isolated operating-system-level component comprises the registry key; activating the virtualization layer causes the registry key to be functionally merged with a registry of the base operating system.

5. The method of claim 4, wherein: the registry key enables the software product to interact with an additional software product; testing the software product further comprises monitoring interactions between the software product and the additional software product to determine whether the software product and the additional software product interact in an expected manner.

6. The method of claim 1, wherein: the isolated operating-system-level component comprises the hardware driver; activating the virtualization layer causes a hardware device corresponding to the hardware driver to be accessible to the software product; determining whether the software product functions properly when the virtualization layer is active comprises determining whether the software product is able to properly interact with the hardware device; deactivating the virtualization layer causes the hardware device to be inaccessible to the software product.

7. The method of claim 1, wherein: the isolated operating-system-level component further comprises a user profile; the user profile includes registry entries associated with a particular user; activating the virtualization layer causes the user to be logged onto the computing system; testing the software product comprises determining how the software product functions in context of the user's profile; deactivating the virtualization layer causes the user to not be logged onto the computing system.

8. The method of claim 1, wherein: the isolated operating-system-level component further comprises a domain state of a network domain; activating the virtualization layer causes the computing system to be part of the network domain associated with the domain state; testing the software product comprises determining whether the software product would function properly within the network domain.

9. The method of claim 1, wherein: the base operating system comprises an integrated component that corresponds to the isolated operating-system-level component in the virtualization layer; the integrated component would conflict with the isolated operating-system-level component in the virtualization layer if the isolated operating-system-level component were integrated directly into the base operating system; the method further comprises testing the software product while the virtualization layer is inactive to determine how the software product functions when the integrated component is part of the base operating system.

10. The method of claim 1, further comprising: isolating an additional operating-system-level component that corresponds to the selected operating-system-level component in an additional virtualization layer that is distinct from the base operating system and the virtualization layer; activating the additional virtualization layer such that access requests directed to the base operating system for the selected operating-system-level component are redirected to the additional virtualization layer; testing the software product while the additional virtualization layer is active to determine how the software product would function if the additional isolated operating-system-level component were part of the base operating system.

11. A testing system for using virtualization of operating system-level components to facilitate software testing, wherein each operating system-level component comprises at least one of a registry key, a hardware driver, a network driver, or an application programming interface (API), the system comprising:

a testing module programmed to manage software testing with a virtualized operating system component, wherein the testing module operates on a computing device to automatically, autonomously, and without user intervention, perform direct testing of a software product installed on a computing system comprising a base operating system, the testing comprising:

identifying, by the computing device at the request of the testing module, the software product installed on the computing system comprising the base operating system, wherein:

the base operating system comprises a plurality of operating-system-level components;

the base operating system runs directly on the hardware of the computing system; selecting, by the computing device at the request of the testing module, from within the plurality of operating-system-level components, an operating-system-level component for use in testing, wherein selecting the operating-system-level component comprises excluding at least one other component from within the plurality of operating-system-level components from use in testing;

isolating, by the computing device at the request of the testing module, isolation module programmed to isolate an operating-system-level component that corresponds to the selected operating-system-level component in a virtualization layer that is distinct from the base operating system; activating, by the computing device at the request of the testing module, the virtualization layer such that access requests directed to the base operating system for the selected operating-system-level component are redirected to the virtualization layer;

testing, by the computing device at the request of the testing module, a test module programmed to test the software product while the virtualization layer is active to determine how the software product would function if the isolated operating-system-level component were part of the base operating system;

after the testing is complete, deactivating, by the computing device at the request of the testing module, the virtualization layer such that the isolated operating-system-level component is no longer visible to the base operating system or the software product;

comparing, by the computing device at the request of the testing module, functionality of the software product when the virtualization layer is inactive to functionality of the software product when the virtualization layer is active to determine whether the software product functions properly when the virtualization layer is active;

at least one processor configured to execute the testing module.

12. The testing system of claim 11, wherein: the isolated operating-system-level component comprises the registry key; the testing module is programmed to activate the virtualization layer by causing the registry key to be functionally merged with a registry of the base operating system.

13. The testing system of claim 11, wherein: the isolated operating-system-level component comprises the hardware driver; by activating the virtualization layer, the testing module causes a hardware device corresponding to the hardware driver to be accessible to the software product; the testing module is programmed to test the software product by determining whether the software product is able to properly interact with the hardware device; by deactivating the virtualization layer, the testing module causes the hardware device to be inaccessible to the software product.

14. The testing system of claim 11, wherein: the isolated operating-system-level component further comprises a user profile; the user profile includes registry entries associated with a particular user; by activating the virtualization layer, the testing module causes the user to be logged onto the computing system; the testing module is programmed to test the software product by determining how the software product functions in context of the user's profile; deactivating the virtualization layer causes the user to not be logged onto the computing system.

15. The testing system of claim 11, wherein: the isolated operating-system-level component further comprises a domain state of a network domain; by activating the virtualization layer, the testing module causes the computing system to be part of the network domain associated with the domain state; the testing module is programmed to test the software product by determining whether the software product would function properly within the network domain.

16. The testing system of claim 11, wherein: the testing module is programmed to isolate an additional operating system-level component that corresponds to the selected operating-system-level component in an additional virtualization layer that is distinct from the base operating system and the virtualization layer; the testing module is programmed to activate the additional virtualization layer such that access requests directed to the base operating system for the selected operating-system-level component are redirected to the additional virtualization layer;

the testing module is programmed to test the software product while the additional virtualization layer is active to determine how the software product would function if the additional isolated operating-system-level component were part of the base operating system.

17. A non-transitory computer-readable-storage medium comprising computer-readable instructions that, when executed by at least one processor of a computing device, cause the computing device to: manage software testing with a virtualized operating system component, the virtualized operating system component comprising at least one of a registry key, a hardware driver, a network driver, or an application programming interface (API), wherein the software testing uses a testing module operating on the computing device to automatically, autonomously, and without user intervention, perform direct testing of a software product installed on a computing system comprising a base operating system, the testing comprising: identifying, by the computing device at the request of the testing module, the software product installed on the computing system comprising the base operating system, wherein:

the base operating system comprises a plurality of operating-system-level components;

the base operating system runs directly on the hardware of the computing system; selecting, by the computing device at the request of the testing module, from within the plurality of operating-system-level components, an operating-system-level component for use in testing, wherein selecting the operating-system-level component comprises excluding at least one other component from within the plurality of operating-system-level components from use in testing;

isolating, by the computing device at the request of the testing module, an operating-system-level component that corresponds to the selected operating-system-level component in a virtualization layer that is distinct from the base operating system;

activating, by the computing device at the request of the testing module, the virtualization layer such that access requests directed to the base operating system for the selected operating-system-level component are redirected to the virtualization layer;

testing, by the computing device at the request of the testing module, the software product while the virtualization layer is active to determine how the software product would function if the isolated operating-system level component were part of the base operating system;

after the testing is complete, deactivating, by the computing device at the request of the testing module, the virtualization layer such that the isolated operating-system-level component is no longer visible to the base operating system or the software product;

comparing, by the computing device at the request of the testing module, functionality of the software product when the virtualization layer is inactive to functionality of the software product when the virtualization layer is active to determine whether the software product functions properly when the virtualization layer is active.

18. The method of claim 1, wherein: testing the software product comprises performing remote testing by sending instructions to a communication interface of the computing system.

19. The method of claim 1, wherein: the selected operating-system-level component comprises an individual element of the base operating system; during testing, the isolated operating-system-level component comprises the only virtualized component on the computing system.

20. The method of claim 19, wherein the individual element of the base operating system consists of one of: the registry key; the hardware driver; the networking driver; the API.

* * * * *

UNITED STATES PATENT AND TRADEMARK OFFICE
CERTIFICATE OF CORRECTION

| | |
|---|---|
| PATENT NO. | : 9,116,725 B1 |
| APPLICATION NO. | : 13/048305 |
| DATED | : August 25, 2015 |
| INVENTOR(S) | : Bradley Baird |

It is certified that error appears in the above-identified patent and that said Letters Patent is hereby corrected as shown below:

Claims

Claim 1, at column 18, lines 36 to 43, should read:
A computer-implemented method for using virtualization of operating-system-level components to facilitate software testing, wherein each operating-system-level component comprises at least one of a registry key, a hardware driver, a network driver, or an application programming interface (API), at least a portion of the method being performed by a computing device comprising at least one processor, the method comprising:

Claim 1, at column 18, lines 55 to 58, should read:
the base operating system comprises a plurality of operating-system-level components;

the base operating system runs directly on the hardware of the computing system;

Claim 1, at column 18, lines 59 to 67, and column 19, lines 1 to 23, should read:
    selecting, by the computing device at the request of the testing module, from within the plurality of operating-system-level components, an operating-system-level component for use in testing, wherein selecting the operating-system-level component comprises excluding at least one other component from within the plurality of operating-system-level components from use in testing;
    isolating, by the computing device at the request of the testing module, an operating-system-level component that corresponds to the selected operating-system-level component in a virtualization layer that is distinct from the base operating system;
    activating, by the computing device at the request of the testing module, the virtualization layer such that access requests directed to the base operating system for the selected operating-system-level component are redirected to the virtualization layer;
    testing, by the computing device at the request of the testing module, the software product while the virtualization layer is active to determine how the software product would function if the isolated operating-system-level component were part of the base operating system;

Signed and Sealed this
Twenty-second Day of March, 2016

Michelle K. Lee
*Director of the United States Patent and Trademark Office* after the testing is complete, deactivating, by the computing device at the request of the testing module, the virtualization layer such that the isolated operating-system-level component is no longer visible to the base operating system or the software product;

comparing, by the computing device at the request of the testing module, functionality of the software product when the virtualization layer is inactive to functionality of the software product when the virtualization layer is active to determine whether the software product functions properly when the virtualization layer is active.

Claim 2, at column 19, lines 24 to 26, should read:
The method of claim 1, wherein:

the computing system comprises a software development environment;

testing the software product comprises debugging the software product.

Claim 3, at column 19, lines 27 to 32, should read:
The method of claim 1, wherein:

determining whether the software product functions properly when the virtualization layer is active comprises determining whether the software product would function properly if the isolated operating-system-level component were part of the base operating system.

Claim 4, at column 19, lines 33 to 36, should read:
The method of claim 1, wherein:

the isolated operating-system-level component comprises the registry key;

activating the virtualization layer causes the registry key to be functionally merged with a registry of the base operating system.

Claim 5, at column 19, lines 37 to 43, should read:
The method of claim 4, wherein:

the registry key enables the software product to interact with an additional software product;

testing the software product further comprises monitoring interactions between the software product and the additional software product to determine whether the software product and the additional software product interact in an expected manner.

Claim 6, at column 19, lines 44 to 53, should read:
The method of claim 1, wherein:

the isolated operating-system-level component comprises the hardware driver;

activating the virtualization layer causes a hardware device corresponding to the hardware driver to be accessible to the software product;

determining whether the software product functions properly when the virtualization layer is active comprises determining whether the software product is able to properly interact with the hardware device;

deactivating the virtualization layer causes the hardware device to be inaccessible to the software product.

Claim 7, at column 19, lines 54 to 62, should read:
The method of claim 1, wherein:

the isolated operating-system-level component further comprises a user profile;

the user profile includes registry entries associated with a particular user;

activating the virtualization layer causes the user to be logged onto the computing system;

testing the software product comprises determining how the software product functions in context of the user's profile;

deactivating the virtualization layer causes the user to not be logged onto the computing system.

Claim 8, at column 19, lines 63 to 67, and column 20, lines 1 to 2, should read:
The method of claim 1, wherein:

the isolated operating-system-level component further comprises a domain state of a network domain;

activating the virtualization layer causes the computing system to be part of the network domain associated with the domain state;

testing the software product comprises determining whether the software product would function properly within the network domain.

Claim 9, at column 20, lines 3 to 13, should read:
The method of claim 1, wherein:

the base operating system comprises an integrated component that corresponds to the isolated operating-system-level component in the virtualization layer;

the integrated component would conflict with the isolated operating-system-level component in the virtualization layer if the isolated operating-system-level component were integrated directly into the base operating system;

the method further comprises testing the software product while the virtualization layer is inactive to determine how the software product functions when the integrated component is part of the base operating system.

Claim 10, at column 20, lines 14 to 26, should read:
The method of claim 1, further comprising:

isolating an additional operating-system-level component that corresponds to the selected operating-system-level component in an additional virtualization layer that is distinct from the base operating system and the virtualization layer;

activating the additional virtualization layer such that access requests directed to the base operating system for the selected operating-system-level component are redirected to the additional virtualization layer;

testing the software product while the additional virtualization layer is active to determine how the software product would function if the additional isolated operating-system-level component were part of the base operating system.

Claim 11, at column 20, lines 27 to 32, should read:
A testing system for using virtualization of operating-system-level components to facilitate software testing, wherein each operating-system-level component comprises at least one of a registry key, a hardware driver, a network driver, or an application programming interface (API), the system comprising:

Claim 11, at column 20, lines 33 to 40, should read:
a testing module programmed to manage software testing with a virtualized operating system component, wherein the testing module operates on a computing device to automatically, autonomously, and without user intervention, perform direct testing of a software product installed on a computing system comprising a base operating system, the testing comprising:

Claim 11, at column 20, lines 47 to 66, should read:
the base operating system runs directly on the hardware of the computing system;

selecting, by the computing device at the request of the testing module, from within the plurality of operating-system-level components, an operating-system-level component for use in testing, wherein selecting the operating-system-level component comprises excluding at least one other component from within the plurality of operating-system-level components from use in testing;

isolating, by the computing device at the request of the testing module, an operating-system-level component that corresponds to the selected operating-system-level component in a virtualization layer that is distinct from the base operating system;

activating, by the computing device at the request of the testing module, the virtualization layer such that access requests directed to the base operating system for the selected operating-system-level component are redirected to the virtualization layer;

Claim 11, at column 21, lines 1 to 6, should read:
testing, by the computing device at the request of the testing module, the software product while the virtualization layer is active to determine how the software product would function if the isolated operating-system-level component were part of the base operating system;

Claim 12, at column 21, lines 21 to 25, should read:
The testing system of claim 11, wherein:

the isolated operating-system-level component comprises the registry key;

the testing module is programmed to activate the virtualization layer by causing the registry key to be functionally merged with a registry of the base operating system.

Claim 13, at column 21, lines 26 to 35, should read:
The testing system of claim 11, wherein:

the isolated operating-system-level component comprises the hardware driver;

by activating the virtualization layer, the testing module causes a hardware device corresponding to the hardware driver to be accessible to the software product;

the testing module is programmed to test the software product by determining whether the software product is able to properly interact with the hardware device;

by deactivating the virtualization layer, the testing module causes the hardware device to be inaccessible to the software product.

Claim 14, at column 21, lines 36 to 45, should read:
The testing system of claim 11, wherein:

the isolated operating-system-level component further comprises a user profile;

the user profile includes registry entries associated with a particular user;

by activating the virtualization layer, the testing module causes the user to be logged onto the computing system;

the testing module is programmed to test the software product by determining how the software product functions in context of the user's profile;

deactivating the virtualization layer causes the user to not be logged onto the computing system.

Claim 15 at column 21, lines 46 to 53, should read:
The testing system of claim 11, wherein:

the isolated operating-system-level component further comprises a domain state of a network domain;

by activating the virtualization layer, the testing module causes the computing system to be part of the network domain associated with the domain state;

the testing module is programmed to test the software product by determining whether the software product would function properly within the network domain.

Claim 16, at column 21, lines 54 to 63, should read:
The testing system of claim 11, wherein:

the testing module is programmed to isolate an additional operating-system-level component that corresponds to the selected operating-system-level component in an additional virtualization layer that is distinct from the base operating system and the virtualization layer;

the testing module is programmed to activate the additional virtualization layer such that access requests directed to the base operating system for the selected operating-system-level component are redirected to the additional virtualization layer;

Claim 17, at column 22, lines 3 to 18, should read:
A non-transitory computer-readable-storage medium comprising computer-readable instructions that, when executed by at least one processor of a computing device, cause the computing device to:

manage software testing with a virtualized operating system component, the virtualized operating system component comprising at least one of a registry key, a hardware driver, a network driver, or an application programming interface (API), wherein the software testing uses a testing module operating on the computing device to automatically, autonomously, and without user intervention, perform direct testing of a software product installed on a computing system comprising a base operating system, the testing comprising:

identifying, by the computing device at the request of the testing module, the software product installed on the computing system comprising the base operating system, wherein:

Claim 17, at column 22, lines 21 to 29, should read:
the base operating system runs directly on the hardware of the computing system;

selecting, by the computing device at the request of the testing module, from within the plurality of operating-system-level components, an operating-system-level component for use in testing, wherein selecting the operating-system-level component comprises excluding at least one other component from within the plurality of operating-system-level components from use in testing;

Claim 17, at column 22, lines 40 to 45, should read:
testing, by the computing device at the request of the testing module, the software product while the virtualization layer is active to determine how the software product would function if the isolated operating-system-level component were part of the base operating system;

CERTIFICATE OF CORRECTION (continued)
U.S. Pat. No. 9,116,725 B1

Claim 18, at column 22, lines 58 to 61, should read:
The method of claim 1, wherein:

testing the software product comprises performing remote testing by sending instructions to a communication interface of the computing system.

Claim 19, at column 22, lines 62 to 66, should read:
The method of claim 1, wherein:

the selected operating-system-level component comprises an individual element of the base operating system;

during testing, the isolated operating-system-level component comprises the only virtualized component on the computing system.

Claim 20, at column 23, lines 1 to 4, should read:
The method of claim 19, wherein the individual element of the base operating system consists of one of:

the registry key;

the hardware driver;

the networking driver;

the API.